(12) United States Patent
Paulson

(10) Patent No.: US 6,992,030 B2
(45) Date of Patent: Jan. 31, 2006

(54) LOW-DENSITY GLASS FOR FLAT PANEL DISPLAY SUBSTRATES

(75) Inventor: Thomas E. Paulson, Corning, NY (US)

(73) Assignee: Corning Incorporated, Corning, NY (US)

( * ) Notice: Subject to any disclaimer, the term of this patent is extended or adjusted under 35 U.S.C. 154(b) by 118 days.

(21) Appl. No.: 10/232,500

(22) Filed: Aug. 29, 2002

(65) Prior Publication Data

US 2004/0043887 A1    Mar. 4, 2004

(51) Int. Cl.
C03C 3/091    (2006.01)
C03C 3/093    (2006.01)
C03C 3/087    (2006.01)

(52) U.S. Cl. .......................... 501/66; 501/69; 501/70; 501/67

(58) Field of Classification Search ............ 501/65–67, 501/68–70
See application file for complete search history.

(56) References Cited

U.S. PATENT DOCUMENTS

| | | | |
|---|---|---|---|
| 3,338,696 A | 8/1967 | Dockerty | 65/145 |
| 3,682,609 A | 8/1972 | Dockerty | 65/83 |
| 5,374,595 A | 12/1994 | Dumbaugh, Jr. et al. | 501/66 |
| 5,459,109 A | 10/1995 | Lapp | 501/66 |
| 5,801,109 A * | 9/1998 | Nishizawa et al. | 501/66 |
| 6,060,168 A * | 5/2000 | Kohli | 428/428 |
| 6,319,867 B1 | 11/2001 | Chacon et al. | 501/66 |
| 6,417,124 B1 * | 7/2002 | Peuchert et al. | 501/66 |
| 6,468,933 B1 * | 10/2002 | Narita et al. | 501/56 |
| 6,508,083 B1 * | 1/2003 | Naka et al. | 65/134.3 |
| 6,537,937 B1 * | 3/2003 | Nishizawa et al. | 501/66 |
| 6,664,203 B2 * | 12/2003 | Nagashima et al. | 501/66 |
| 2001/0034293 A1 | 10/2001 | Peuchert et al. | 501/66 |

FOREIGN PATENT DOCUMENTS

| | | |
|---|---|---|
| EP | 0 714 862 A1 | 6/1996 |
| WO | WO 98/27019 | 6/1998 |
| WO | WO 00/32528 | 6/2000 |
| WO | WO 02/060831 | 8/2002 |
| WO | WO 02/060831 A2 * | 8/2002 |

OTHER PUBLICATIONS

Patent Abstracts of Japan, vol. 2000, No. 23, Feb. 10, 2001, JP 2001 15134A (Nippon Electric Glass Co. Ltd.) Jun. 5, 2001, abstract.

* cited by examiner

*Primary Examiner*—Karl Group
*Assistant Examiner*—Elizabeth A. Bolden
(74) *Attorney, Agent, or Firm*—Siwen Chen

(57) ABSTRACT

Disclosed is a glass material essentially free of BaO and alkali oxide particularly suitable for the glass substrate of LCDs. The glass material consists essentially, expressed in mole percent on an oxide basis, of 70–80%, preferably 72–77% of $SiO_2$, 3–9%, preferably 4–7% of $Al_2O_3$, 8–18%, preferably 10–16% $B_2O_3$, 3–10%, preferably 3–8% of CaO, 0–4%, preferably 0–3% RO, 0–0.2%, preferably 0–0.1% SnO, 0–1%, preferably 0 to 0.5% of XO, where RO represents, collectively, MgO, SrO and ZnO, XO represents, collectively, $TiO_2$, $ZrO_2$, $Y_2O_3$ and $La_2O_3$. The glass has a strain point in the range of over about 600° C., a coefficient of thermal expansion (CTE) in the range of about $23-35 \times 10^{-7}/°$ C., a density lower than about 2.35 g/cm$^3$, a liquidus temperature lower than or equal to about 1200° C. and a durability in BHF less than or equal to 0.5 mg/cm$^2$ weight loss.

28 Claims, No Drawings

LOW-DENSITY GLASS FOR FLAT PANEL DISPLAY SUBSTRATES

FIELD OF THE INVENTION

The present invention relates to glass materials in the $CaO-Al_2O_3-B_2O_3-SiO_2$ system, glass articles comprised of such glass, and processes for making such glass materials and such glass articles. In particular, the present invention relates to $CaO-Al_2O_3-B_2O_3-SiO_2$ glass materials exhibiting desirable physical and chemical properties for substrates of flat panel displays, flat glass sheets comprised of such glass materials, as well as processes for making the glass materials and glass sheets of the present invention.

BACKGROUND OF THE INVENTION

Display devices may be broadly classified into two categories: emissive displays such as cathode ray tubes (CRTs) and plasma display panels (PDPs), and non-emissive displays. The latter category, to which liquid crystal displays (LCD) belong, relying on an external light source, with the display serving only as a light modulator. In the case of LCD, this external light source may be ambient light (used in refractive displays) or a dedicated light source (such as the backlighting units of direct view displays).

A LCD relies upon three inherent features of the liquid crystal (LC) material to modulate light. The first is the ability of the LC to cause the optical rotation of polarized light. The second is the ability of the LC to establish this rotation by mechanical orientation of the liquid crystal. The third feature is the ability of the liquid crystal to establish this orientation by the application of an external electric field.

In the production of a simple, twisted nematic (TN) liquid crystal display, two substrates surround a layer of liquid crystal material. In a display type known as Normally White, the application of alignment layers on the inner surface of the substrates creates a 90° spiral of the liquid crystal director. This means that the polarization of linearly polarized light entering one face of the liquid crystal will be rotated by 90° by the liquid crystal material. Polarization films, oriented 90° to each other, are placed on the outer surfaces of the substrates.

Light, upon entering the first polarization film, becomes linearly polarized. Traversing the liquid crystal cell, the polarization of this light is rotated 90° and is allowed to exit through the second polarization film. Application of an electric field across the liquid crystal layer aligns the liquid crystal directors with the field, interrupting its ability to rotate light. Linearly polarized light passing through this cell does not have its polarization rotated and hence is blocked by the second polarization film. Thus, in the simplest sense, the liquid crystal material becomes a light valve, whose ability to allow or block light transmission is controlled by the application of an electric field.

The above description pertains to the operation of a single pixel in a liquid crystal display. High information type displays require the assembly of several millions of these pixels, which are referred to as sub-pixels, into a matrix format. Addressing, or applying an electric field to all of these sub-pixels while maximizing addressing speed and minimizing cross-talk presents several challenges. One of the preferred ways to address sub-pixels is by controlling the electric field with thin film of transistors located at each sub-pixel, which forms the basis of the active matrix liquid crystal displays (AMLCD) devices.

The manufacturing of these displays is extremely complex, and the properties of the substrate glass are extremely important. First and foremost, the glass substrates used in the production of AMLCD devices need have their physical dimensions tightly controlled. The downdraw sheet or fusion process, described in U.S. Pat. No. 3,338,696 (Dockerty) and U.S. Pat. No. 3,682,609 (Dockerty), is one of the few capable of delivering such product without requiring costly post forming finishing operations, such as lapping and polishing. Unfortunately, the fusion process places rather severe restrictions on the glass properties, requiring relatively high liquidus viscosity, preferably greater than 200,000 poise.

Typically, the two substrates that comprise the display are manufactured separately. One, the color filter plate, has a series of red, blue, green, and black organic dyes deposited on it. Each of these primary colors must correspond precisely with the pixel electrode areas of the companion active plate. To remove the influence of differences between the ambient thermal conditions encountered during the manufacture of the two plates, it is desirable to use glass substrates whose dimensions are independent of thermal condition (i.e., glasses with lower coefficient of thermal expansion). However, this property needs to be balanced by the generation of stresses between deposited films and the substrates that arise due to expansion mismatch.

The active plate, so called because it contains the active, thin film transistors, is manufactured using typical semiconductor type processes. These include sputtering, CVD, photolithography, and etching. It is highly desirable that the glass be unchanged during these processes. Thus, the glass needs to demonstrate both thermal and chemical stability.

Thermal stability (also known as thermal compaction or shrinkage) is dependent upon both the inherent viscous nature of a particular glass composition (as indicated by its strain point) and the thermal history of the glass sheet as determined by the manufacturing process. Glasses with a strain point in excess of 600° C. and with the thermal history of the fusion process will have acceptable thermal stability for active plates based both on amorphous silicon (a-Si) thin film transistors (TFTs) and super low temperature polysilicon (p-Si) TFTs. Higher temperature processing (such as required by low temperature p-Si TFTs) may require the addition of an annealing step to the glass substrate to ensure thermal stability.

Chemical stability implies a resistance to attack of various etching solutions used in the manufacture processes. Of particular interest is the resistance to attack from the dry etching conditions used to etch the silicon layer. To benchmark the dry etching conditions, a substrate sample is exposed to an etching solution known as 110BHF. This test consists of immersing a sample of glass in a solution of 1 volume of 50% by weight HF and 10 volumes 40% by weight $NH_4F$ at 30° C. for 5 minutes. The sample is graded on weight loss and appearance.

In addition to these requirements, AMLCD manufacturers are finding that both demand for larger display sizes and the economics of scale are driving them to process larger sized pieces of glass. Current industry standards are Gen III (550 mm×650 mm) and Gen 111.5 (600 mm×720 mm), but future efforts are geared toward Gen IV (1 m×1 m) sizes, and potentially larger sizes. This raises several concerns. First and foremost is the weigh of the glass. The 50% and more increase in glass weight in going from Gen III.5 to Gen IV has significant implications for the robotic handlers used to ferry the glass into and through process stations. Lower density of the glass substrates also contributes to the mobility of the LCDs. In addition, elastic sag, which is dependent upon glass density and Young's modules, becomes more of an issue with larger sheet sizes impacting the ability to load, retrieve, and space the glass in the cassettes used to transport the glass between process stations.

Accordingly, it would be desirable to provide a glass material for display devices having a low density to alleviate difficulties associated with large sheet size, preferably less than 2.35 g/cm$^3$ and a liquidus viscosity greater about 200,000 poise. In addition, it would be desirable for the glass to have thermal expansion between about 23–35×10$^{-7}$/° C., and preferably between about 25–30×10$^{-7}$/° C., over the temperature range of 0–300° C. Furthermore, it would be advantageous for the glass to have a strain point over about 600° C., preferably in the range of about 600° C. to about 700° C., more preferably in the range of about 600° C. to about 660° C., and for the glass to be resistant to attack from etching solutions.

SUMMARY OF THE INVENTION

The present invention is founded in the discovery of a glass material having a density lower than 2.35 g/cm$^3$, preferably in the range of 2.18–2.30 g/cm$^3$, more preferably in the range of 2.19–2.30 g/cm$^3$, a liquidus temperature lower than or equal to about 1200° C., and a liquidus viscosity (defined as the viscosity of the glass at the liquidus temperature) greater than about 200,000 poise, preferably greater than about 400,000 poise, more preferably greater than about 600,000 poise, and most preferably greater than about 800,000 poise. Additionally, the glass of the present invention exhibits a linear coefficient of thermal expansion over the range of 0–300° C. between about 23–35×10$^{-7}$/° C., preferably between 25–30×10$^{-7}$/° C., and a strain point over about 600° C., preferably between about 600° C. to 700° C., more preferably between about 600° C. and about 660° C. The glass of the present invention has a 500 poise temperature (defined as the temperature at which the glass viscosity is about 500 poise) lower than about 1750° C. In addition, the glass of the present invention exhibits a durability, expressed in terms of weight loss after immersion in a solution of 1 volume of 50 wt. % HF and 10 volumes of 40 wt. % NH$_4$F for 5 minutes at 30° C., of less than about 0.5 mg/cm$^2$, preferably less than 0.3 mg/cm$^2$, and more preferably less than 0.2 mg/cm$^2$.

The glass material of the present invention has a composition consisting essentially, expressed by mole on an oxide basis, of

| | |
|---|---|
| SiO$_2$: | 70–80% |
| Al$_2$O$_3$: | 3–9% |
| B$_2$O$_3$: | 8–18% |
| CaO: | 3–10% |
| RO: | 0–4% |
| SnO: | 0–0.2% |
| XO: | 0–1% | where RO represents, collectively, MgO, SrO and ZnO; XO represents, collectively, TiO$_2$, ZrO$_2$, Y$_2$O$_3$ and La$_2$O$_3$; and essentially free of BaO and alkali oxides.

Preferably, the glass material essentially free of BaO and alkali oxide of the present invention has a composition consisting essentially, expressed by mole on an oxide basis, of

| | |
|---|---|
| SiO$_2$: | 72–77% |
| Al$_2$O$_3$: | 4–7% |
| B$_2$O$_3$: | 10–16% |
| CaO: | 3–8% |
| RO: | 0–3% |
| SnO: | 0–0.1% |
| XO: | 0–0.5% | where RO and XO have the same meaning as defined above.

It has been discovered that for glasses having the compositions and physical properties discussed above, especially the preferred compositions and the preferred properties, the liquidus viscosity of the glass is strongly influenced by the ratio of the sum of the mole percentages of alkaline earth oxides and ZnO, R'O (R'O represents, collectively, MgO, CaO, SrO and ZnO) to the mole percentage of Al$_2$O$_3$, viz., the R'O/Al$_2$O$_3$ ratio. This ratio should be preferably held within 0.8–1.5. Most preferably, this R'O/Al$_2$O$_3$ range should be between 0.9 and 1.3, in order to obtain the highest liquidus viscosity.

It has also been discovered that, a low density glass of the present invention is obtained when the mole percentages of the respective oxides in the glass composition meet the following provisos: (i)–0.25<(R'O–Al$_2$O$_3$)/B$_2$O$_3$<0.25, and preferably 0<(R'O—Al$_2$O$_3$)/B$_2$O$_3$<0.15, and (ii) (R'O+Al$_2$O$_3$)/B$_2$O$_3$<2, where R'O represents, collectively, MgO, CaO, SrO and ZnO.

The glass of the present invention is essentially free of BaO, which means that the glass composition preferably contains less than about 0.1% by mole of BaO. The glass of the present invention is essentially free of alkali oxides, which means that it contains preferably a total of less than about 0.1% by mole of alkali oxides. Additionally, the glass of the present invention may contain fining agents, such as the oxides of arsenic, antimony, cerium, tin and/or chlorine/fluorine. However, preferably, the glass of the present invention is essentially free of arsenic oxide and antimony oxide for environmental concerns.

In another aspect of the present invention, it is provided flat glass sheets comprised of the glass of the present invention that are particularly suitable for use as LCD substrates.

In still another aspect of the present invention, it is provided a method for producing the glass materials and the glass sheets of the present invention.

Additional features and advantages of the invention will be set forth in the detailed description which follows, and in part will be readily apparent to those skilled in the art from the description or recognized by practicing the invention as described in the written description and claims hererof.

It is to be understood that the foregoing general description and the following detailed description are merely exemplary of the invention, and are intended to provide an overview or framework to understanding the nature and character of the invention as it is claimed.

DETAILED DESCRIPTION OF THE PRESENT INVENTION

The present invention is concerned with improved glasses for use as flat panel display substrates. In particular, the glass of the present invention meets the various requirements of such substrates.

The glass in accordance with the present invention exhibits a density in the range of 2.18–2.35 g/cm$^3$, preferably 2.19–2.30 g/cm$^3$, a coefficient of thermal expansion in the temperature range of 0–300° C. of 23–35×10$^{-7}$/° C., preferably 25–30×10$^{-7}$/° C., a strain point over about 600° C., preferably between about 600–700° C., more preferably between about 600–660° C. High strain point and low coefficient of thermal expansion are desirable to help prevent panel distortion due to compaction/shrinkage during subsequent thermal processing.

For more demanding manufacturing conditions such as the fusion process, described in U.S. Pat. No. 3,338,696 (Dockerty) and U.S. Pat. No. 3,682,609 (Dockerty), a glass having a high liquidus viscosity is required. Therefore, in a preferred embodiment of the present invention, the glass should exhibit a density less than 2.35 g/cm$^3$ and a liquidus viscosity greater than about 200,000 poise, preferably greater than about 400,000 poise, more preferably greater than about 600,000 poise, and most preferably greater than about 800,000 poise. Although substrates made from glass of the present invention can be made using other manufacturing processes such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. Glass substrates produced according to the present invention and using the fusion process have an average surface roughness as measured by atomic force microscopy of less than 0.5 nm.

Chemical durability involves resistance of the glass to attack of the various etchant solutions used in the manufacture process. Of particular interest is the resistance to attack from dry etching conditions used to etch the silicon layer of the LCD. One benchmark of the dry etching conditions is exposure to an etchant solution known as 110BHF. This test consists of immersing a sample of glass in a solution of 1 volume of 50 wt. % HF and 10 volumes of 40 wt. % NH$_4$F at 30° C. for 5 minutes. The chemical resistance is determined by measuring the weight loss in terms of mg/cm$^2$ during the process.

The glasses of the present invention include 70–80%, and preferably 72–77% by mole of SiO$_2$ as the primary glass former. Increasing SiO$_2$ content improves the liquidus viscosity and reduces the density and CTE of the glass, but excessive SiO$_2$ is detrimental to the melting temperatures. The glasses also comprise 3–9%, preferably 4–7% by mole of Al$_2$O$_3$. Higher Al$_2$O$_3$ percentage increases glass durability and decrease CTE, but liquidus temperature increases correspondingly. At least 3 mol % of Al$_2$O$_3$ is required in the glass composition in order to have the desired strain point; however, more than 9 mol % results in a less than desired liquidus temperature.

The glasses of the present invention further contain 8–18 mol %, preferably 10–16 mol % B$_2$O$_3$. Increasing B$_2$O$_3$ content lowers the liquidus temperature and density and thus it is preferably present at least 8 mol %. More than 18 mol % B$_2$O$_3$ will lead to less than desired glass strain point.

CaO is useful in lowering both the melting and liquidus temperatures of the glass; however, more than 10 mol % will result in a less than desired CTE. Therefore, CaO is present in the glass composition of the present invention at 3–10 mol %, preferably 3–8 mol %.

Other alkaline earth oxides, including MgO and SrO, as well as ZnO, collectively referred to as RO in the present application, can be included in the glass composition of the present invention in the amount of 0–4 mol %, preferably 0–3 mol %. MgO is beneficial in reducing glass density, but high MgO content lowers liquidus viscosity and raises the liquidus temperature as well.

An important aspect of the glass of the present invention is its low density. The present inventor has discovered that, in order to achieve the low density range of 2.18–2.35 g/cm$^3$, the compositional range specified above is necessary. In order to achieve a desirable liquidus viscosity, it is desired that the mole percentages of the respective oxides in the glass composition meet the following proviso: 0.8≦R'O/Al$_2$O$_3$≦1.5, preferably 0.9≦R'O/Al$_2$O$_3$≦1.3, where R'O represents, collectively, MgO, CaO, SrO and ZnO. In order to achieve a low density, it is desired that the respective mole percentages of the oxides meet the following provisos: (i)−0.25<(R'O−Al$_2$O$_3$)/B$_2$O$_3$<0.25, preferably 0<(R'O—Al$_2$O$_3$)/B$_2$O$_3$<0.15, and (ii)(Al$_2$O$_3$+R'O)/B$_2$O$_3$<2, where R'O has the same meaning as defined above.

Due to their negative effects on the thin film transistor (TFT) performance, alkalis such as Li$_2$O, Na$_2$O, K$_2$O, and the like, are controlled and excluded from the compositions of the present invention glass. It is an important feature of the glass composition of the present invention that it is essentially free of alkali oxides. BaO as a heavy oxide tends to negatively increase the glass density, and thus is controlled to be essentially free in the glass compositions of the present invention.

Fining agents, such as SnO$_2$, CeO$_2$, sulfates, F, Cl, As$_2$O$_3$, Sb$_2$O$_3$, and the like, may also be present in the compositions of the glasses of the present invention to aid in removing seeds in the final glass during the glass melting and fining process. Of course, the glasses of the present invention may contain contaminants as typically found in commercially prepared glasses. In addition, the following materials may be added to the glass compositions in the amount of 0–1 mol % without pushing the properties of the glass out of the limits specified above: TiO$_2$, ZrO$_2$, Y$_2$O$_3$ and/or La$_2$O$_3$.

Flat glass sheet having the glass composition and the properties of the glasses of the present invention suitable for LCD glass substrates is another aspect of the present invention. Such glass sheet should advantageously have a surface smoothness (Ra) of less than 0.50 nm as measured by atomic force microscopy (AFM), and an internal stress less than about 150 psi. Such substrates can be produced using conventional glass making processes, such as float process, fusion draw process and slot draw process, to name a few. Other processes may be employed as well. One of skill in the art can calculate the batch compositions of the glass using various starting materials. To meet the requirements of LCD manufacturing, some glass sheets produced from these processes may need to be polished before using. Fusion draw process, as disclosed in U.S. Pat. No. 3,338,696 (Dockerty) and U.S. Pat. No. 3,682,609 (Dockerty) can produce glass sheets with high dimensional consistency and surface smoothness which can be used directly for LCD glass substrates without the need of further polishing and is thus preferred. As noted supra, a high liquidus viscosity is required for the fusion draw process. The glass of the present invention, due to its high liquidus viscosity, is compatible with the fusion draw process.

The present invention is further illustrated by the following examples, which are meant to be illustrative only, and by no means should be construed to be limiting in any way the claimed invention.

EXAMPLES

TABLE I sets forth exemplary glass compositions, where the amounts of the oxides are expressed in terms of parts by mole on an oxide basis. TABLE II sets forth the same glass compositions as in TABLE I in terms of weight percentage of the oxides, calculated from the mole percentages. The following discussion of the examples are based on the data in TABLE I.

TABLE I

| Example No. | 1 | 2 | 3 | 4 | 5 | 6 | 7 | 8 | 9 |
|---|---|---|---|---|---|---|---|---|---|
| $SiO_2$ | 76.1 | 74.1 | 74.0 | 74.0 | 76.1 | 72.0 | 74.0 | 76.1 | 72.0 |
| $B_2O_3$ | 10 | 10 | 10 | 10 | 12 | 11 | 13 | 14 | 14 |
| $Al_2O_3$ | 7.1 | 8.1 | 8.0 | 8.0 | 6.0 | 8.5 | 6.5 | 4.0 | 6.0 |
| CaO | 6.3 | 7.3 | 8.0 | 6.0 | 4.4 | 8.0 | 6.0 | 4.5 | 7.5 |
| MgO | | | | 2.0 | 1.0 | | | | |
| SrO | | | | | | | | | |
| ZnO | | | | | | | | | |
| $Al_2O_3$ as $Al_2Cl_6$ | | | | | | | | 1.0 | |
| CaO as $CaBr_2$ | 0.5 | 0.5 | | | 0.5 | 0.5 | 0.5 | 0.5 | 0.5 |
| CaO as $CaCl_2$ | | | | | | | | | |
| SnO | 0.05 | 0.05 | | | 0.05 | 0.05 | 0.05 | 0.05 | 0.05 |
| $As_2O_3$ | | | 0.2 | 0.2 | | | | | |
| $CTE_{RT-300}$ ($\times 10^{-7}/°C$) | 27.2 | 28.2 | 29.1 | 27.3 | 24.4 | 29.6 | 27.6 | 28.2 | 29.9 |
| Den. (g/cm³) | 2.288 | 2.311 | 2.310 | 2.296 | 2.254 | 2.318 | 2.265 | 2.227 | 2.282 |
| Soft. Pt. (° C.) | 1045 | 1032 | 1018 | 1016 | 1037 | 1016 | 1017 | 1040 | 984 |
| Ann. Pt. (° C.) | 741 | 742 | 731 | 723 | 712 | 730 | 713 | 696 | 695 |
| Str. Pt. (° C.) | 681 | 681 | 672 | 665 | 650 | 672 | 654 | 636 | 641 |
| Viscosity @ 1750° C. (poise) | 422 | 237 | 234 | 251 | 461 | 162 | 325 | 545 | 191 |
| Liq. Temp. (° C.) | 1110 | 1120 | 1150 | 1165 | 1035 | 1095 | 1005 | 1080 | 985 |
| Liq. Visc. ($\times 10^6$ poise) | 5.3 | 2.2 | 0.83 | 0.60 | 29.0 | 2.1 | 40.0 | 8.9 | 19.8 |
| Young's Modulus (Mpsi) | — | — | 9.9 | 9.8 | — | 9.9 | 10.2 | — | 9.3 |
| Dur. in BHF (mg/cm²) | — | — | 0.18 | 0.22 | — | — | — | — | — |

| Example No. | 10 | 11 | 12 | 13 | 14 | 15 | 16 | 17 | 18 |
|---|---|---|---|---|---|---|---|---|---|
| $SiO_2$ | 74.0 | 76.1 | 76.1 | 76.1 | 76.1 | 76.1 | 74.0 | 74.1 | 76.1 |
| $B_2O_3$ | 14 | 14 | 10 | 16 | 12 | 12 | 12 | 8 | 14 |
| $Al_2O_3$ | 5.0 | 5.0 | 6.0 | 4.6 | 6.61 | 5.67 | 7.37 | 8.6 | 5 |
| CaO | 6.5 | 4.4 | 7.5 | 2.3 | 4.79 | 5.73 | 6.13 | 7.3 | 3.9 |
| MgO | | | | | | | | | |
| SrO | | | | | | | | | 1 |
| ZnO | | | | | | | | 2 | |
| $Al_2O_3$ as $Al_2Cl_6$ | | | | | | | | | |
| CaO as $CaBr_2$ | 0.5 | 0.5 | 0.5 | | | | | | |
| CaO as $CaCl_2$ | | | | 1.0 | 0.5 | 0.5 | 0.5 | | |
| SnO | 0.05 | 0.15 | 0.1 | | | | 0.05 | | |
| $As_2O_3$ | | | | | | | | | 0.3 |
| $CTE_{RT-300}$ ($\times 10^{-7}/°C$) | 27.3 | 26.7 | 29.2 | 26.2 | 26.3 | 29.0 | 26.8 | 27.3 | 28.1 |
| Den. (g/cm³) | 2.257 | 2.229 | 2.299 | 2.194 | 2.254 | 2.261 | 2.282 | 2.358 | 2.246 |
| Soft. Pt. (° C.) | 1007 | 1030 | 1021 | 1031 | 1045 | 1040 | 1022 | 998 | 1029 |
| Ann. Pt. (° C.) | 693 | 691 | 722 | 673 | 722 | 712 | 725 | 739 | 690 |
| Str. Pt. (° C.) | 640 | 628 | 655 | 609 | 659 | 652 | 665 | 682 | 626 |
| Viscosity @ 1750° C. (poise) | 321 | 650 | 380 | 805 | 399 | 507 | 285 | | |
| Liq. Temp. (° C.) | 1095 | 1085 | 1160 | 1200 | 1180 | 1090 | 1150 | | |
| Liq. Visc. ($\times 10^6$ poise) | 1.9 | 7.9 | 1.0 | 0.67 | 1.0 | 7.0 | 1.1 | | |
| Young's Modulus (Mpsi) | 9.1 | 8.7 | — | — | — | — | 9.5 | | |
| Dur. in BHF (mg/cm²) | — | — | 0.16 | 0.19 | 0.15 | 0.15 | 0.27 | | |

| Example No. | 19 | 20 | 21 | 22 | 23 | 24 | 25 | 26 | 27 |
|---|---|---|---|---|---|---|---|---|---|
| $SiO_2$ | 76.1 | 76.1 | 76.1 | 76.1 | 76.1 | 76.1 | 76.1 | 76.1 | 78 |
| $B_2O_3$ | 14 | 14 | 12 | 12 | 12 | 10 | 10 | 10 | 14 |
| $Al_2O_3$ | 5 | 5 | 6 | 6 | 6 | 7 | 7 | 7 | 3.81 |
| CaO | 2.9 | 1.9 | 4.9 | 3.9 | 2.9 | 5.9 | 4.9 | 3.9 | 3.69 |
| MgO | | | | | | | | | |
| SrO | 2 | 3 | 1 | 2 | 3 | 1 | 2 | 3 | |
| ZnO | | | | | | | | | |
| $Al_2O_3$ as $Al_2Cl_6$ | | | | | | | | | |
| CaO as $CaBr_2$ | | | | | | | | | 0.5 |
| CaO as $CaCl_2$ | | | | | | | | | |
| SnO | | | | | | | | | 0.05 |

TABLE I-continued

|  |  |  |  |  |  |  |  |  |  |
|---|---|---|---|---|---|---|---|---|---|
| As$_2$O$_3$ | 0.3 | 0.3 | 0.3 | 0.3 | 0.3 | 0.3 | 0.3 | 0.3 |  |
| CTE$_{RT-300}$ (×10$^{-7}$/° C.) | 30.1 | 28.6 | 29.0 | 30.4 | 30.2 | 29.5 | 30.5 | 31.8 | 25.3 |
| Den. (g/cm$^3$) | 2.262 | 2.277 | 2.279 | 2.293 | 2.308 | 2.308 | 2.323 | 2.337 | 2.208 |
| Soft. Pt. (° C.) | 1027 | 1027 | 1032 | 1038 | 1037 | 1042 | 1038 | 1038 | 1061 |
| Ann. Pt. (° C.) | 684 | 687 | 711 | 708 | 711 | 733 | 738 | 729 | 691 |
| Str. Pt. (° C.) | 621 | 623 | 649 | 645 | 648 | 673 | 675 | 665 | 625 |
| Viscosity @ 1750° C. (poise) |  |  |  |  |  |  |  |  |  |
| Liq. Temp. (° C.) |  |  |  |  |  |  |  |  |  |
| Liq. Visc. (×10$^6$ poise) |  |  |  |  |  |  |  |  |  |
| Young's Modulus (Mpsi) |  |  |  |  |  |  |  |  |  |
| Dur. in BHF (mg/cm$^2$) |  |  |  |  |  |  |  |  |  |

TABLE II

| Example No. | 1 | 2 | 3 | 4 | 5 | 6 | 7 | 8 | 9 |
|---|---|---|---|---|---|---|---|---|---|
| SiO$_2$ | 71.16 | 68.87 | 68.92 | 69.26 | 71.61 | 66.68 | 69.15 | 69.42 | 67.45 |
| B$_2$O$_3$ | 10.83 | 10.77 | 10.79 | 10.84 | 13.08 | 11.81 | 14.07 | 14.8 | 15.2 |
| Al$_2$O$_3$ | 11.27 | 12.78 | 12.64 | 12.71 | 9.58 | 13.36 | 10.31 | 7.58 | 9.54 |
| CaO | 5.94 | 6.77 | 6.96 | 5.25 | 4.3 | 7.35 | 7.35 | 4.25 | 6.99 |
| MgO |  |  |  | 1.26 | 0.64 |  |  |  |  |
| SrO |  |  |  |  |  |  |  |  |  |
| ZnO |  |  |  |  |  |  |  |  |  |
| SnO | 0.11 | 0.11 |  |  | 0.11 | 0.11 | 0.11 | 0.11 | 0.11 |
| As$_2$O$_3$ |  |  | 0.62 | 0.62 |  |  |  |  |  |
| CTE$_{RT-300}$ (× 10$^{-7}$/° C.) | 27.2 | 28.2 | 29.1 | 27.3 | 24.4 | 29.6 | 27.6 | 28.2 | 29.9 |
| Den. (g/cm$^3$) | 2.288 | 2.311 | 2.31 | 2.296 | 2.254 | 2.318 | 2.265 | 2.227 | 2.282 |
| Soft. Pt. (° C.) | 1045 | 1032 | 1018 | 1016 | 1037 | 1016 | 1017 | 1040 | 984 |
| Ann. Pt. (° C.) | 741 | 742 | 731 | 723 | 712 | 730 | 713 | 696 | 695 |
| Str. Pt. (° C.) | 681 | 681 | 672 | 665 | 650 | 672 | 654 | 636 | 641 |
| Viscosity @ 1750° C. (poise) | 422 | 237 | 234 | 251 | 461 | 162 | 325 | 545 | 191 |
| Liq. Temp. (° C.) | 1110 | 1120 | 1150 | 1165 | 1035 | 1095 | 1005 | 1080 | 985 |
| Liq. Visc. (×10$^6$ poise) | 5.3 | 2.2 | 0.83 | 0.60 | 29.0 | 2.1 | 40.0 | 8.9 | 19.8 |
| Young's Modulus (Mpsi) | — | — | 9.9 | 9.8 | — | 9.9 | 10.2 | — | 9.3 |
| Dur. in BUF (mg/cm$^2$) | — | — | 0.18 | 0.22 | — | — | — | — | — |

| Example No. | 10 | 11 | 12 | 13 | 14 | 15 | 16 | 17 | 18 |
|---|---|---|---|---|---|---|---|---|---|
| SiO$_2$ | 69.75 | 71.49 | 71.57 | 71.29 | 71.23 | 71.86 | 68.86 | 68.88 | 70.95 |
| B$_2$O$_3$ | 15.29 | 15.24 | 10.9 | 17.37 | 13.02 | 13.13 | 12.94 | 8.61 | 15.13 |
| Al$_2$O$_3$ | 7.99 | 7.98 | 9.58 | 7.31 | 10.5 | 8.67 | 11.64 | 13.57 | 7.91 |
| CaO | 6.16 | 4.29 | 7.02 | 2.88 | 4.62 | 5.71 | 5.76 | 6.33 | 3.40 |
| MgO |  |  |  |  |  |  |  |  |  |
| SrO |  |  |  |  |  |  |  |  | 1.61 |
| ZnO |  |  |  |  |  |  |  | 2.52 |  |
| SnO | 0.11 | 0.32 | 0.22 |  |  |  | 0.11 |  |  |
| As$_2$O$_3$ |  |  |  |  |  |  |  |  | 0.92 |
| CTE$_{RT-300}$ (× 10$^{-7}$/° C.) | 27.3 | 26.7 | 29.2 | 26.2 | 26.3 | 29.0 | 26.8 | 27.3 | 28.1 |
| Den. (g/cm$^3$) | 2.257 | 2.229 | 2.299 | 2.194 | 2.254 | 2.261 | 2.282 | 2.358 | 2.246 |
| Soft. Pt. (° C.) | 1007 | 1030 | 1021 | 1031 | 1045 | 1040 | 1022 | 998 | 1029 |
| Ann. Pt. (° C.) | 693 | 691 | 722 | 673 | 722 | 712 | 725 | 739 | 690 |
| Str. Pt. (° C.) | 640 | 628 | 655 | 609 | 659 | 652 | 665 | 682 | 626 |
| Viscosity @ 1750° C. (poise) | 321 | 650 | 380 | 805 | 399 | 507 | 285 |  |  |
| Liq. Temp. (° C.) | 1095 | 1085 | 1160 | 1200 | 1180 | 1090 | 1150 |  |  |
| Liq. Visc. (×10$^6$ poise) | 1.9 | 7.9 | 1.0 | 0.67 | 1.0 | 7.0 | 1.1 |  |  |
| Young's Modulus (Mpsi) | 9.1 | 8.7 | — | — | — | — | 9.5 |  |  |
| Dur. in BHF (mg/cm$^2$) | — | — | 0.16 | 0.19 | 0.15 | 0.15 | 0.27 |  |  |

TABLE II-continued

| Example No. | 19 | 20 | 21 | 22 | 23 | 24 | 25 | 26 | 27 |
|---|---|---|---|---|---|---|---|---|---|
| $SiO_2$ | 70.41 | 69.90 | 70.74 | 70.22 | 69.69 | 70.53 | 70.01 | 69.50 | 73.97 |
| $B_2O_3$ | 15.01 | 14.9 | 12.93 | 12.83 | 12.73 | 10.74 | 10.66 | 10.58 | 15.38 |
| $Al_2O_3$ | 7.85 | 7.79 | 9.46 | 9.39 | 9.33 | 11.01 | 10.93 | 10.85 | 6.13 |
| CaO | 2.51 | 1.63 | 4.26 | 3.36 | 2.48 | 5.10 | 4.21 | 3.33 | 3.71 |
| MgO | | | | | | | | | |
| SrO | 3.2 | 4.75 | 1.6 | 3.19 | 4.73 | 1.6 | 3.18 | 4.72 | |
| ZnO | | | | | | | | | |
| SnO | | | | | | | | | |
| $As_2O_3$ | 0.92 | 0.91 | 0.92 | 0.91 | 0.91 | 0.92 | 0.91 | 0.90 | |
| $CTE_{RT-300}$ ($\times 10^{-7}/°$ C.) | 30.1 | 28.6 | 29.0 | 30.4 | 30.2 | 29.5 | 30.5 | 31.8 | 25.3 |
| Den. (g/cm$^3$) | 2.262 | 2.277 | 2.279 | 2.293 | 2.308 | 2.308 | 2.323 | 2.337 | 2.208 |
| Soft. Pt. (° C.) | 1027 | 1027 | 1032 | 1038 | 1037 | 1042 | 1038 | 1038 | 1061 |
| Ann. Pt. (° C.) | 684 | 687 | 711 | 708 | 711 | 733 | 738 | 729 | 691 |
| Str. Pt. (° C.) | 621 | 623 | 649 | 645 | 648 | 673 | 675 | 665 | 625 |
| Viscosity @ 1750° C. (poise) | | | | | | | | | |
| Liq. Temp. (° C.) | | | | | | | | | |
| Liq. Visc. ($\times 10^6$ poise) | | | | | | | | | |
| Young's Modulus (Mpsi) | | | | | | | | | |
| Dur. in BHF (mg/cm$^2$) | | | | | | | | | |

In Example 8, both $Al_2Cl_6$ together with other source materials were used as the source of $Al_2O_3$. Thus, the actual mole percentage of $Al_2O_3$ in the final glass should be the sum total of the mole percentage of $Al_2O_3$ and the mole percentage of "$Al_2O_3$ as $Al_2Cl_6$" as reported in TABLE I. Likewise, in some examples, $CaCl_2$ and/or $CaBr_2$ were used in the batch materials. Thus the actual mole percentage of CaO in the final glass should be the sum total of the mole percentage of CaO and the mole percentage of "CaO as $CaBr_2$" and/or "CaO as $CaCl_2$" in TABLE I.

In TABLE I, inasmuch as the sum of the parts in mole of the individual constituents totals or very closely approximates 100, for all practical purposes the reported values may be deemed to represent mole percent. The actual batch ingredients may comprise any materials, either oxides, or other compounds, which, when melted together with the other batch components, will be converted into the desired oxide in the proper proportions. For example, $SrCO_3$ and $CaCO_3$ can provide the source of SrO and CaO, respectively.

These exemplary glasses were prepared by melting 1,000–5,000 gram batches of each glass composition at a temperature and for a time to result in a relatively homogeneous glass composition, e.g., at a temperature of about 1650° C. for a period of about 4–16 hours in platinum crucibles. Also set forth in TABLE I are the relevant glass properties for each glass composition, determined on the glasses in accordance with techniques conventional in the glass art. Thus, the linear coefficient of thermal expansion (CTE) over the temperature range 0–300° C. is expressed in terms of $\times 10^{-7}/°$ C., the softening point (Soft. Pt.) and the annealing point (Ann. Pt.) and strain point (Str. Pt.) are expressed in terms of ° C. These were determined from fiber elongation techniques (ASTM references E228-85, C338 and C336, respectively). The density (Den.), in terms of g/cm$^3$, was measured via the Archimedes method (ASTM C693). The durability in BHF (Dur. in BHF) was measured by immersing a glass sample in a solution of 1 volume of 50 wt. % HF and 10 volumes of 40 wt. % $NH_4F$ at 30° C. for 5 minutes, and reported as weigh loss in terms of mg/cm$^2$.

The liquidus temperature (Liq. Temp.) of the glass was measured using the standard liquidus method. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity (Liq. Visc., in poise) was determined from this temperature and the coefficients of the Fulcher equation. The viscosity at 1750° C. was calculated employing the Fulcher equation fit to the high temperature viscosity data (measured via rotating cylinders viscometry, ASTM C965–81).

Most of the exemplary glass compositions have densities lower than 2.300 g/cm$^3$. All of them have a high strain point of over 600° C., and a liquidus temperature of equal to or lower than 1200° C. The combination of properties indicates they are good for use as LCD glass substrates, and can be produced using the fusion draw process.

It will be apparent to those skilled in the art that various modifications and alterations can be made to the present invention without departing from the scope and spirit of the invention. Thus, it is intended that the present invention covers the modifications and variations of this invention provided they come within the scope of the appended claims and their equivalents.

What is claimed is:

1. A glass material essentially free of BaO and alkali oxides and consisting essentially, by mole on an oxide basis, of the following composition:

| | |
|---|---|
| $SiO_2$: | 70–80% |
| $Al_2O_3$: | 3–9% |
| $B_2O_3$: | 8–18% |
| CaO: | 3–10% |
| RO: | 0–4% |
| SnO: | 0–0.2% |
| XO: | 0–1% | where RO represents, collectively, MgO, SrO and ZnO;
XO represents, collectively, $TiO_2$, $ZrO_2$, $Y_2O_3$ and $La_2O_2$;

wherein the glass material has a strain point over 600° C., a coefficient of thermal expansion (CTE) in the range of $23 \times 10^{-7}/°$ C. to $35 \times 10^{-7}/°$ C. in the temperature range of 0–300° C., a density lower than 2.35 $g/cm_3$, a liquidus temperature lower than, or equal to 1200° C. and a durability in BHF less than or equal to 0.5 $mg/cm^2$ weight loss.

2. A glass material in accordance with claim 1, wherein the mole percentages of the oxides are subjected to the following proviso:

$0.8 \leq R'O/Al_2O_3 \leq 1.5$, where R'O representsb collectively, MgO, CaO, SrO and ZnO.

3. A glass material in accordance with claim 2, wherein the mole percentages of the oxides are further subjected to the following proviso:

$0.9 \leq R'O/Al_2O_3 \leq 1.3$.

4. A glass material in accordance with claim 1 or 2, wherein the mole percentages of the oxides are subjected to the following provisos:
    (i) $0.25 < (R'O-Al_2O_3)/B_2O_3 < 0.25$; and
    (ii) $(R'O+Al_2O_3)/B_2O_3 < 2$,
where R'O represents, collectively, MgO, CaO,SrO and ZnO.

5. A glass material in accordance with claim 4, wherein the mole percentages of the oxides are fttrther subjected to the following proviso:

$0 < (R'O-Al_2O_3)/B_2O_3 < 0.15$.

6. A glass material in accordance with claim 1 consisting essentially, by mole on an oxide basis, of the following composition:

| | |
|---|---|
| $SiO_2$: | 72–77% |
| $Al_2O_3$: | 4–7% |
| $B_2O_3$: | 10–16% |
| CaO: | 3–8% |
| RO: | 0–3% |
| SnO: | 0–0.1% |
| XO: | 0–1% | where RO represents, collectively, MgO, SrO and ZnO.

7. A glass material in accordance with claim 6, wherein the mole percentages of the oxides are subjected to the following proviso:

$0.8 \leq R'O/Al_2O_3 \leq 1.5$, where R'O represents, collectively, MgO, GaO, SrO and ZnO.

8. A glass material in accordance with claim 7, wherein the mole percentages of the oxides are forther subjected to the following proviso:

$0.9 \leq R'O/Al_2O_3 \leq 1.3$.

9. A glass material in accordance with claim 6 or 7, wherein the mole percentages of the oxides are subjected to the following provisos:
    (i) $-0.25 < (R'O-Al_2O_3)/B_2O_3 < 0.25$; and
    (ii) $(R'O+Al_2O_3)/B_2O_3 < 2$,
where R'O represents, collectively, MgO, CaO, SrO and ZnO.

10. A glass material in accordance with claim 9, wherein the mole percentages of the oxides are further subjected to the following proviso:

$0 < (R'O-Al_2O_3)/B_2O_3 < 0.15$.

11. A glass material in accordance with claim 1 or 6 having a strain point in the range of 600–700° C., a CTE in the range of $25 \times 10^{-7}/°$ C. to $30 \times 10^{-7}/°$ C. in the temperature range of 0–300° C., a density in the range of 2.19–2.30 $g/cm^3$ and a durability in BHE less than or equal to 0.3 $mg/cm^2$ weight loss.

12. A glass material in accordance with claim 11 having a durability in BHF less than or equal to 0.2 $mg/cm^2$ weight loss.

13. A glass material in accordance to claim 11 having a strain point in the range of 600–660° C.

14. A glass material in accordance with claim 1 having a liquidus viscosity higher than 400,000 poise.

15. A glass material in accordance with claim 1 having a liquidus viscosity higher than 600,000 poise.

16. A glass material in accordance with claim 1 having a liquidus viscosity higher than 800,000 poise.

17. A glass material in accordance with claim 1 having a viscosity of less than 500 poise at 1750° C.

18. A glass material in accordance with claim 1 substantially free of arsenic and antimony oxides.

19. A flat glass sheet comprised of a glass material essentially free of BaO and alkali oxides and consisting essentially, by mole on an oxide basis, of the following composition:

| | |
|---|---|
| $SiO_2$: | 70–80% |
| $Al_2O_3$: | 3–9% |
| $B_2O_3$: | 8–18% |
| CaO: | 3–10% |
| RO: | 0–4% |
| SnO: | 0–0.2% |
| XO: | 0–1% | where RO represents, collectively, MgO, SrO and ZnO; XO represents, collectively, $TiO_2$, $ZrO_2$, $Y_2O_2$ and $La_2O_3$;

wherein the glass material has a stain point in the range of over 600° C., a coefficient of thermal expansion (CTE) in the range of $23 \times 10^{-7}/°$ C. to $35 \times 10^{-7}/°$ C. in the temperature range of 0–300° C., a density lower than 2.35 $g/cm^3$, a liquidus temperature lower than or equal to 1200° C. and a durability in BHF less than or equal to 0.5 $mg/cm^2$ weight loss.

20. A flat glass sheet in accordance with claim 19, wherein the glass material consists essentially, by mole on an oxide basis, of the following composition:

| | |
|---|---|
| $SiO_2$: | 72–77% |
| $Al_2O_3$: | 4–7% |
| $B_2O_3$: | 10–16% |
| CaO: | 3–8% |
| RO: | 0–3% |
| SnO: | 0–0.1% |
| XO: | 0–0.5% | where RO represents, collectively, MgO, SrO and ZnO.

21. A flat glass sheet in accordance with claim 19 or 20, wherein the glass material has a stain point in the range of 600–700° C., a CTE in the range of $25 \times 10^{-7}/°$ C. to $30 \times 10^{-7}/°$ C. in the temperature range of 0–300° C., a density in the range of 2.19–2.30 $g/cm^3$ and a durability in BHF less than or equal to 0.3 $mg/cm^2$ weight loss.

22. A flat glass sheet in accordance with claim 21, wherein the glass material has a strain point in to range of 600–660° C.

23. A flat glass sheet in accordance with claim 20, wherein to glass material has a durability in BHF less than or equal to 0.2 mg/cm$^2$ weight loss.

24. A flat glass sheet in accordance with claim 19 or 20 further having a surface roughness (Ra) less than 0.5 nm.

25. A flat glass sheet in accordance with claim 24 further having an average internal stress less than 150 psi.

26. In a glass melting process wherein batch materials in the amounts calculated according to the final glass composition are mixed, melted and fined to form the glass, the improvement comprising;
   (i) the ddgalss material of claim 1; and
   (ii) that the batch materials are formed into glass at a temperature less than 1750° C.

27. A process in accordance with claim 26, wherein the amounts of the batch materials are calculated to result in a glass composition essentially free of alkali oxide and BaO, and consisting essentially, expressed in terms of mole percent on an oxide basis, of

| | |
|---|---|
| SiO$_2$: | 72–77% |
| Al$_2$O$_3$: | 4–7% |
| B$_2$O$_3$: | 10–16% |
| CaO: | 3–8% |
| RO: | 0–3% |
| SnO: | 0–0.1% |
| XO: | 0–0.5% | where RO and XO have the same meaning.

28. A process in accordance with claim 26 or 27, wherein the process is a fusion draw process and a flat glass sheet is produced.

* * * * *